US012433415B1

(12) United States Patent
Huser

(10) Patent No.: US 12,433,415 B1
(45) Date of Patent: Oct. 7, 2025

(54) CADDY

(71) Applicant: Brainy Burpers LLC, Noblesville, IN (US)

(72) Inventor: Amy Huser, Noblesville, IN (US)

(73) Assignee: Brainy Burpers LLC, Noblesville, IN (US)

( * ) Notice: Subject to any disclaimer, the term of this patent is extended or adjusted under 35 U.S.C. 154(b) by 0 days.

(21) Appl. No.: 18/780,331

(22) Filed: Jul. 22, 2024

(51) Int. Cl.
*A47C 7/62* (2006.01)
*A61G 7/05* (2006.01)

(52) U.S. Cl.
CPC ............ *A47C 7/624* (2018.08); *A61G 7/0503* (2013.01); *A61G 7/0524* (2016.11)

(58) Field of Classification Search
CPC ..... A47C 7/624; A61G 7/0503; A61G 7/0524
See application file for complete search history.

(56) References Cited

U.S. PATENT DOCUMENTS 2,647,716 A * 8/1953 Hudziak .................. A47C 7/68 211/119.007
3,586,368 A 6/1971 Guild
3,690,724 A * 9/1972 Douglas ................. A47C 7/624 108/44
4,195,880 A * 4/1980 Henkhaus ................ A47C 7/62 248/694
4,484,367 A 11/1984 Jenkins
4,575,149 A * 3/1986 Forestal ................. A47B 23/02 248/240.4
4,662,676 A 5/1987 Havelock
4,821,988 A 4/1989 Jimenez
4,863,134 A 9/1989 Young et al.
5,370,246 A 12/1994 Traynor
D359,258 S * 6/1995 Judycki ........................ D12/133
5,449,067 A * 9/1995 Cannon .................. H02G 11/02 206/388
5,497,926 A * 3/1996 Rittenhouse ......... A61G 5/0883 224/538
5,586,163 A * 12/1996 Goldstein .............. A61B 50/33 378/204
6,012,690 A * 1/2000 Cohen .................... A47G 7/044 248/214
6,345,873 B1 * 2/2002 Kim ........................ F16L 3/223 248/68.1
D636,198 S 4/2011 Gibbs
8,322,690 B2 * 12/2012 Cathlina .................. H02G 1/08 254/134.3 R (Continued)

*Primary Examiner* — Ko H Chan
(74) *Attorney, Agent, or Firm* — Goff IP Law PLLC; Jared S. Goff

(57) ABSTRACT

In some implementations, a caddy can include a shape where the caddy may include a bridge defining a remote seat that is structured to receive a call button remote, the remote seat opening upwardly, and the caddy having one or more protrusions extending up from a periphery of the remote seat. The caddy may also include a pair of legs extending down from the bridge, with a downwardly opening gap between the legs. The caddy may define apertures on opposite ends of the remote seat, each of the apertures being structured to receive a cord of a call button remote while the call button remote is seated in the remote seat. A call button remote can be seated in the remote seat with at least a portion of the call button remote being above the armrest of the medical chair.

3 Claims, 6 Drawing Sheets

(56) References Cited

U.S. PATENT DOCUMENTS

| | | | | |
|---|---|---|---|---|
| 8,858,492 | B2 * | 10/2014 | Fitzgerald | A61F 9/00736 604/131 |
| 8,979,190 | B2 * | 3/2015 | Madrigal | A47C 7/705 297/161 |
| 9,033,162 | B2 * | 5/2015 | Brotzman | A61B 50/20 211/126.14 |
| 9,095,222 | B2 | 8/2015 | Asaf et al. | |
| 9,687,402 | B2 | 6/2017 | Ellis et al. | |
| 10,548,685 | B2 * | 2/2020 | Gibbs | A61B 90/50 |
| 11,504,288 | B2 | 11/2022 | Alston | |
| 11,647,840 | B2 * | 5/2023 | Nelson | A47C 7/624 297/217.6 |
| 2009/0152915 | A1 * | 6/2009 | Krasna | A47C 7/624 297/217.3 |
| 2011/0295193 | A1 * | 12/2011 | Fitzgerald | A61F 9/00736 604/22 |
| 2016/0059992 | A1 * | 3/2016 | Pierre-Pipkin | A47C 7/624 220/500 |
| 2020/0206051 | A1 * | 7/2020 | Alston | A61G 7/0524 |
| 2020/0261938 | A1 * | 8/2020 | Haden | B05B 15/62 |
| 2022/0115907 | A1 * | 4/2022 | Bober | H02J 50/005 |
| 2022/0400868 | A1 * | 12/2022 | Nelson | A47C 7/725 |
| 2024/0269025 | A1 * | 8/2024 | Williams | A61G 7/0503 |

* cited by examiner

CADDY

BACKGROUND

Medical patient rooms such as hospital rooms may include chairs, such as recliners or other chairs (referred to herein as medical chairs or hospital chairs) in which medical patients can be seated. Medical patient rooms can also include one or more types of medical equipment for treating patients.

SUMMARY

The present disclosure relates to a caddy system, such as a caddy system that includes a caddy that is mountable on an armrest of a chair such as a medical chair or other chair, such as for supporting a call button remote and/or other medical equipment.

In one general aspect, a caddy system may include a caddy, including a shape where the caddy may include the following: a bridge defining a remote seat that is structured to receive a call button remote, the remote seat opening upwardly, and the caddy having one or more protrusions extending up from a periphery of the remote seat; and a pair of legs extending down from the bridge, with a downwardly opening gap formed between the legs.

In another general aspect, a caddy system may include a caddy that is structured to be removably mounted on a medical chair armrest, the caddy having a remote seat structured to receive a call button remote, the caddy defining apertures on opposite ends of the remote seat, each of the apertures being structured to receive a cord of a call button remote while the call button remote is seated in the remote seat.

In another general aspect, a method may include mounting a caddy on an armrest of a medical chair, the caddy having: a bridge defining an upwardly open remote seat; and a pair of legs extending down from the bridge on opposite sides of the armrest. The method may also include positioning at least a portion of a call button remote in a seated position on the remote seat with at least a portion of the call button remote being above the armrest of the medical chair.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

The description and drawings may refer to the same or similar features in different drawings with the same reference numbers.

DETAILED DESCRIPTION

Figure 1:
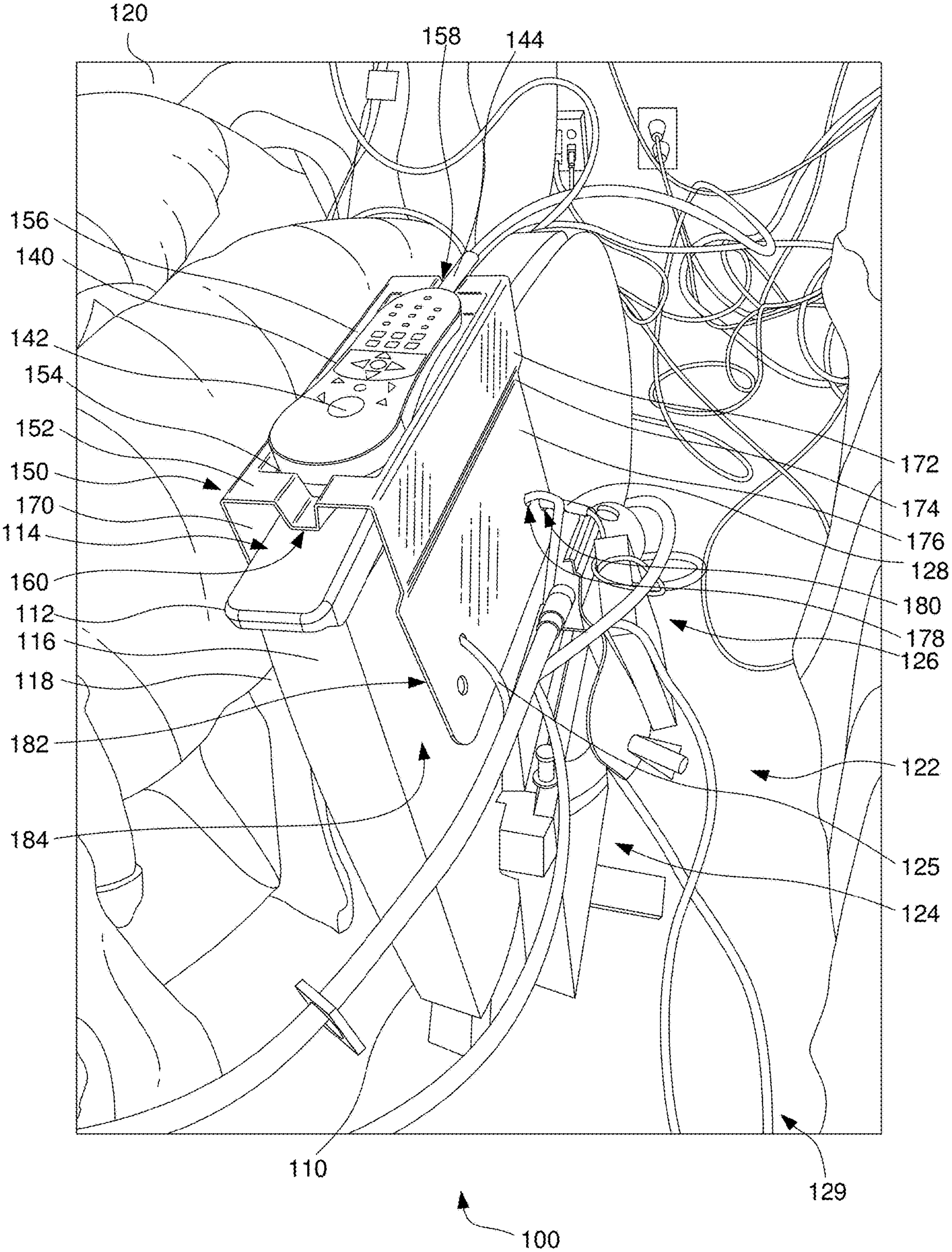
FIG. 1 is a perspective view of a caddy system.

The present description relates to a caddy system 100, as illustrated in FIG. 1 through FIG. 9, which can be utilized in a medical setting such as a hospital setting to organize and manage various medical equipment and accessories. The caddy system 100 can be mounted on a chair 110 such as a medical chair (e.g., a hospital chair) for a medical patient, which may provide a convenient and accessible location for supporting a call button remote and/or other medical equipment.

The chair 110 can include an armrest 112, which can include a top armrest surface 114. The chair 110 can also include an armrest support 116 supporting the armrest 112. The chair 110 can also include a chair seat 118 designed to accommodate and support a patient 120. Medical equipment 122, such as a chest tube drainage system 124 and/or a Foley catheter bag 126, can be used for the patient 120 while the patient is sitting in the chair 110. The medical equipment 122 can include fasteners for securing the medical equipment in place. For example, the chest tube drainage system 124 can be secured using chest tube drainage system hooks 125, while the Foley catheter bag 126 can be hung using a Foley catheter bag hook 128. Lines 129, such as cords and hoses, can be connected to the medical equipment 122.

A call button remote 140, which can include a call button 142, can be seated on the caddy 150. As used herein, a call button remote is a medical call button remote, such as a hospital call button remote. Such a call button remote 140 can be operational to respond to a patient's press of the call button 142 by activating a call system (for example, a remote cord 144 may provide a wired connection into a call system and/or the call button remote 140 may be operational to make a wireless call into the call system) to call for professional medical personnel such as a nurse when a patient 120 desires help.

The caddy 150 can be structured to be removably mounted on the armrest 112 of the chair 110. The caddy 150 can include a bridge 152 that defines a remote seat 154 that can open upwardly. The remote seat 154 can be structured to receive and support the call button remote 140 while the call button remote 140 is seated in the remote seat 154 of the bridge 152 of the caddy 150. The caddy 150 can also include one or more seat protrusions 156 extending up from the periphery of the remote seat 154. The remote seat 154 can be formed as an aperture such as a depression between the seat protrusions 156. The seat protrusions 156 can help to secure the call button remote 140 in place, such as inhibiting horizontal sliding movement of the call button remote 140 out of the remote seat 154. In an example, the remote seat 154 can be from about 2.8 inches wide to about 3.5 inches wide (from left side to right side) and from about 8 inches long to about 9 inches long (from front to back).

Figure 2:
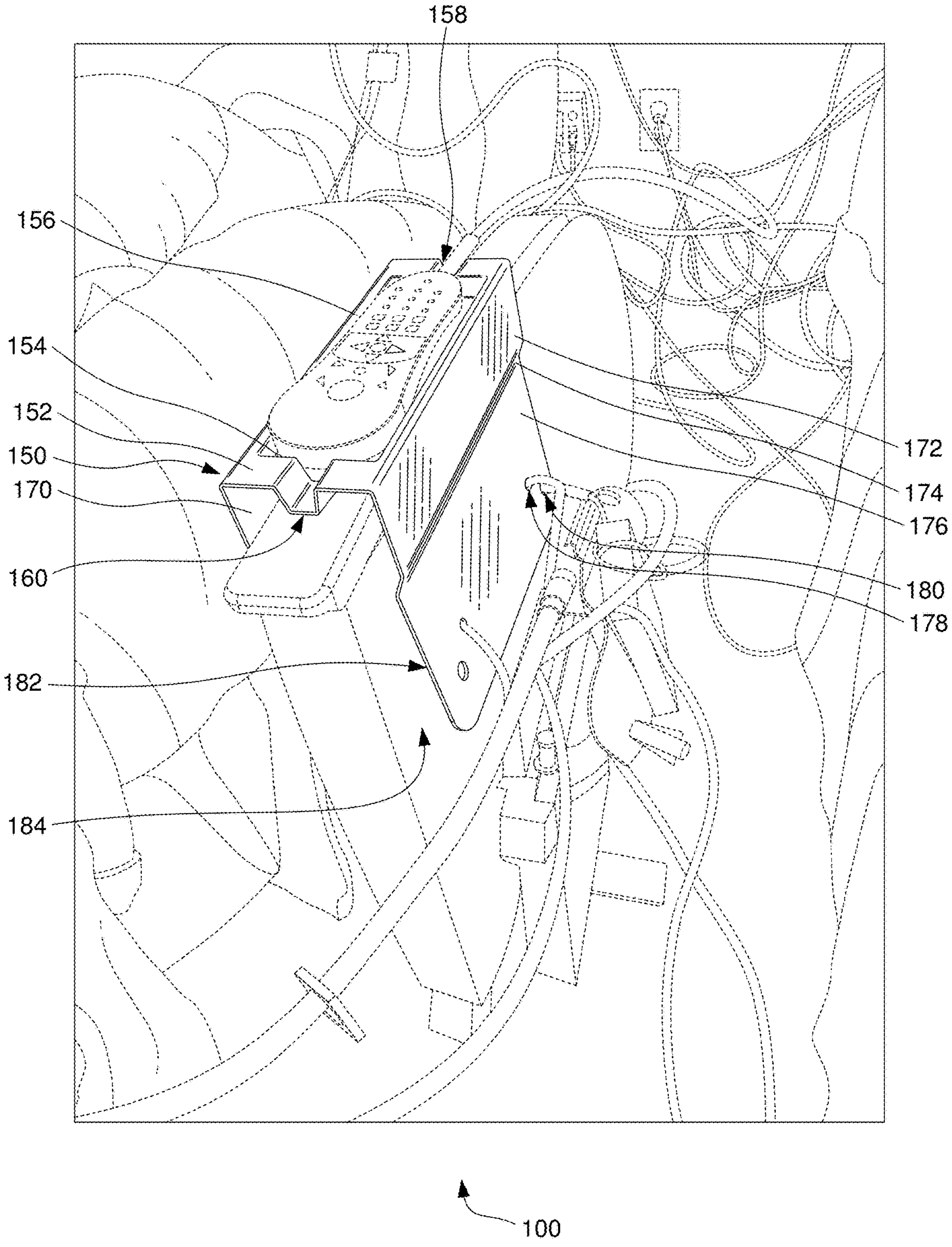
FIG. 2 is a perspective view of the caddy system of FIG. 1 with items other than the caddy in dashed lines to highlight the caddy.
Figure 3:
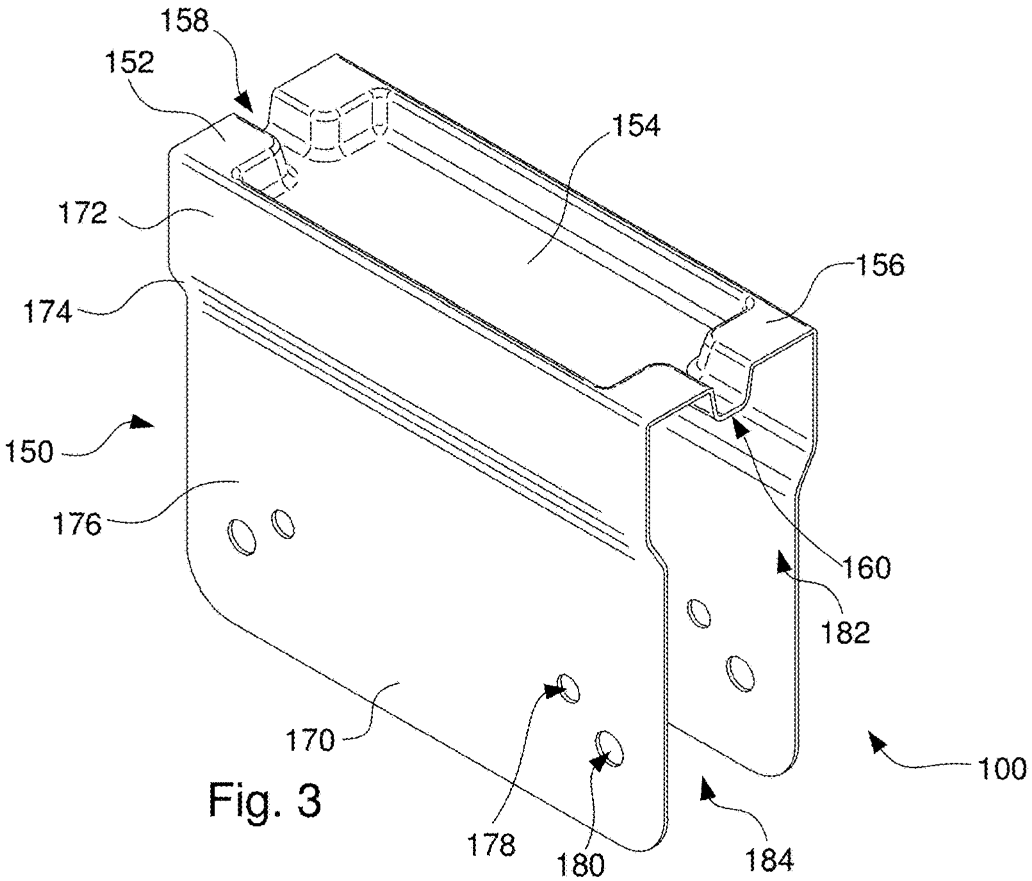
FIG. 3 is a top perspective view of the caddy of the caddy system of FIG. 1.
Figure 4:
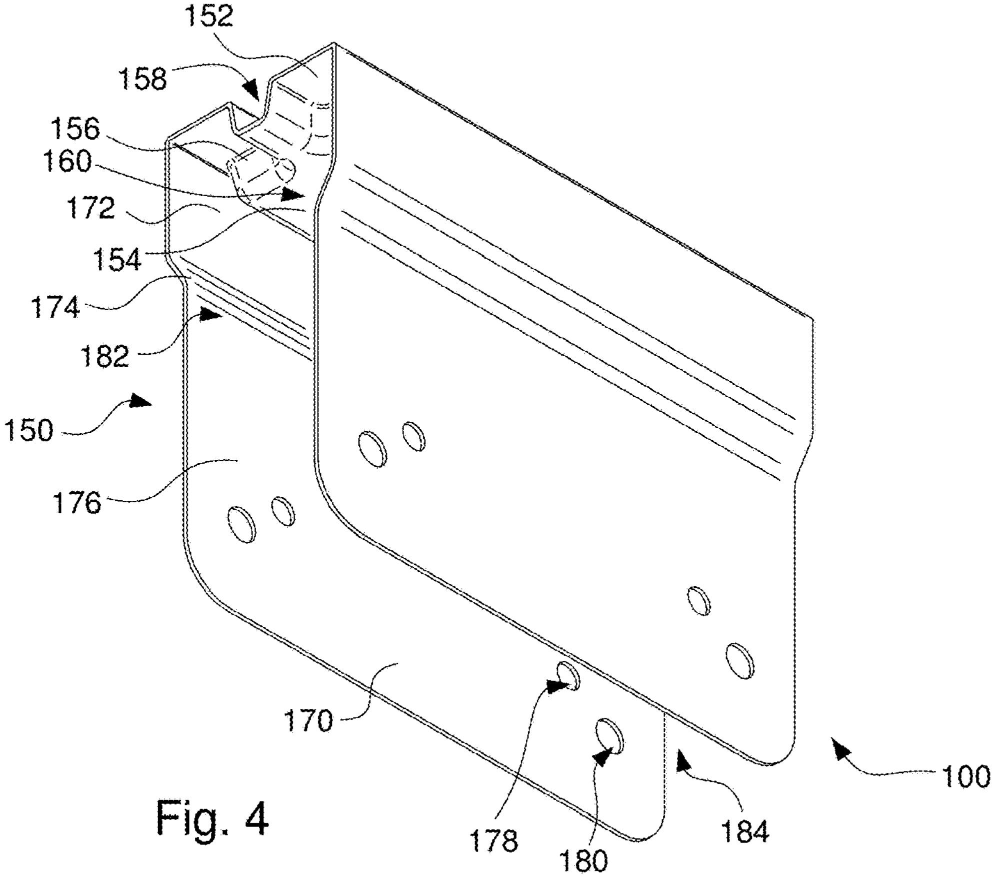
FIG. 4 is a bottom perspective view of the caddy of FIG. 3.
Figure 5:
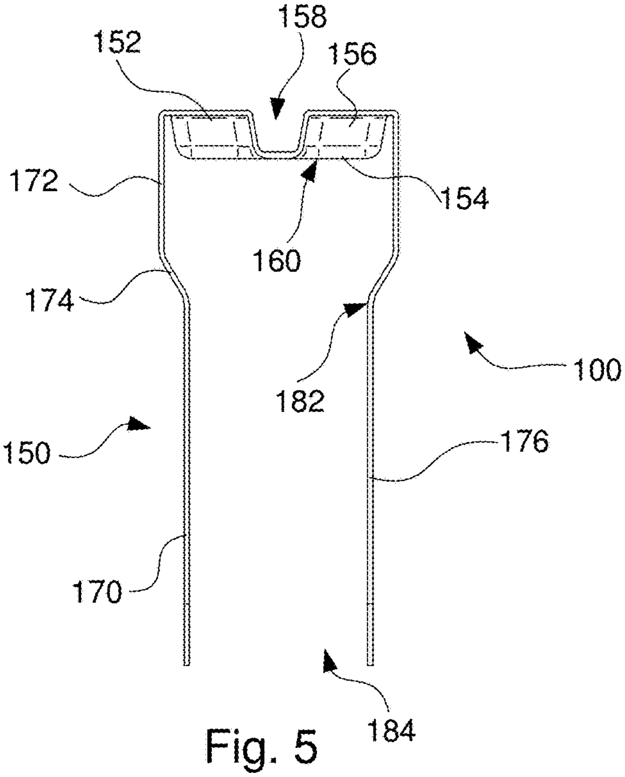
FIG. 5 is a front view of the caddy of FIG. 3. A back view of the caddy of FIG. 3 is the same as the front view.
Figure 6:
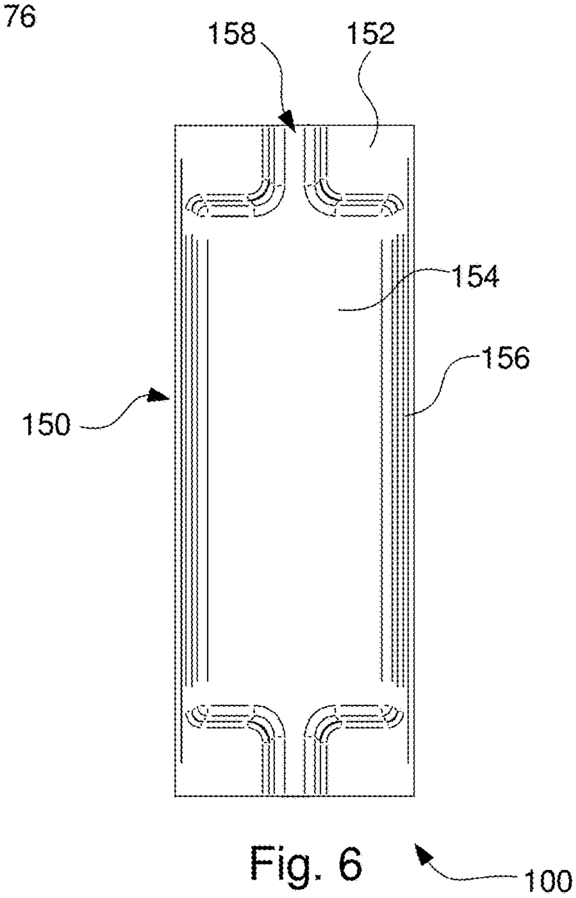
FIG. 6 is a top view of the caddy of FIG. 3.
Figure 7:
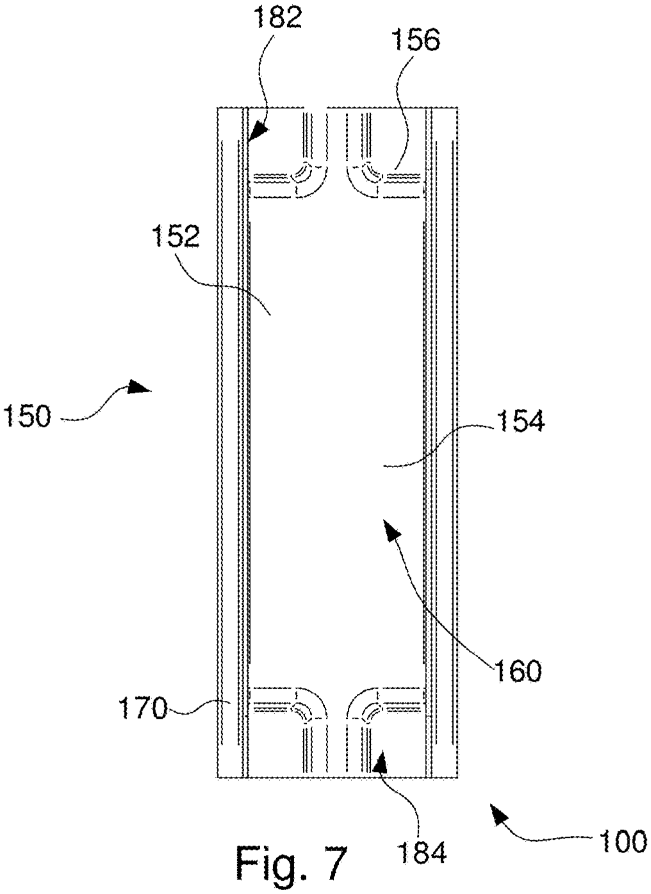
FIG. 7 is a bottom view of the caddy of FIG. 3.
Figure 8:
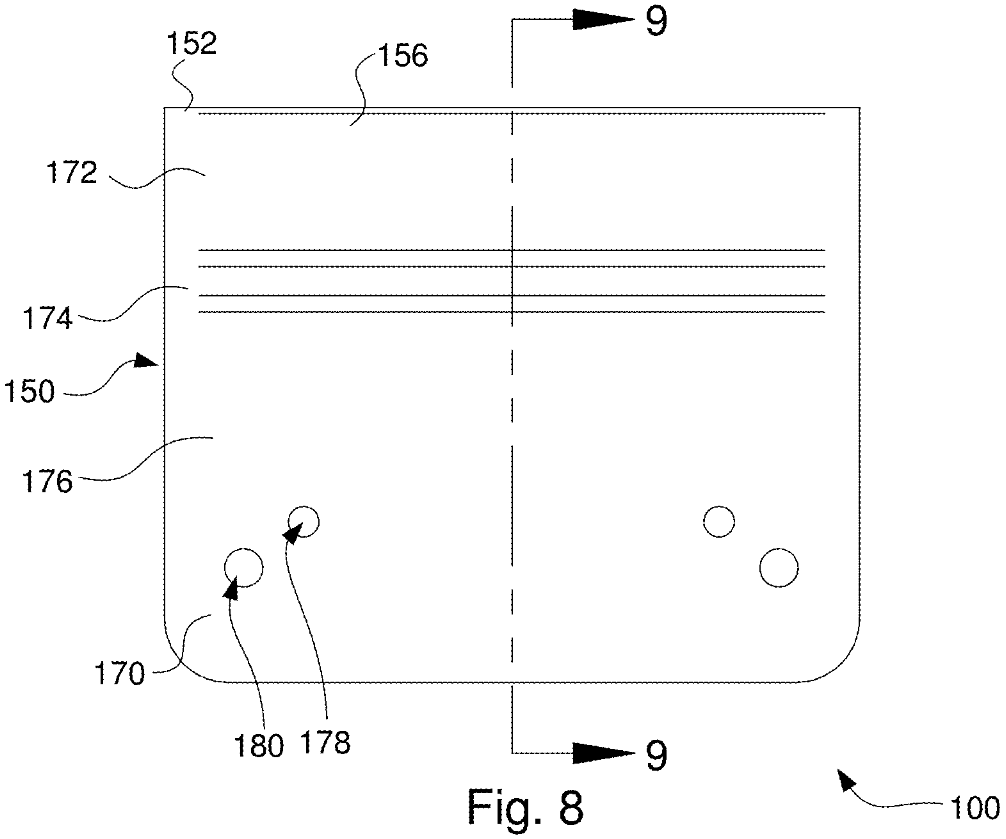
FIG. 8 is a right-side view of the caddy of FIG. 3. A left-side view of the caddy of FIG. 3 is the same as the right-side view.
Figure 9:
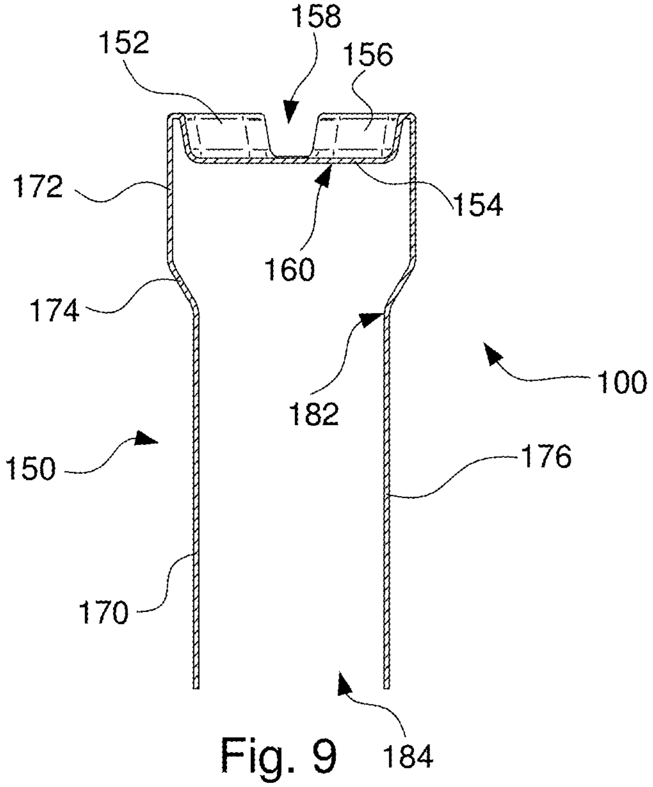
FIG. 9 is a section view taken along line 9-9 of FIG. 8.
Figure 10:
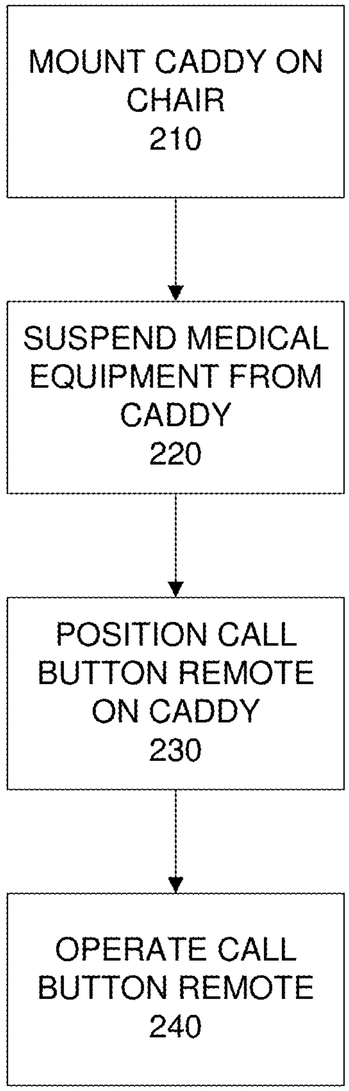
FIG. 10 is a flowchart of a caddy technique.

The caddy 150 can include a pair of legs 170 that extend down from the bridge 152. These legs 170 can be designed to straddle the armrest 112 as illustrated in FIGS. 1-2, with the armrest 112 and/or the armrest support 116 positioned within the downwardly opening gap 184 between the legs 170. Each leg 170 can be divided into a vertically extending top leg section 172, an inwardly tapering middle leg section 174 below the top leg section 172, and a vertically extending bottom leg section 176 below the middle leg section 174. In an example, the inner surfaces of the top leg sections 172 of the legs 170 can be about 3.7 inches from each other when the legs 170 are not flexed, so that the gap between the legs 170 at the top leg sections 172 can be about 3.7 inches wide. Also, in an example, the inner surfaces of the bottom leg sections 176 can be about 2.9 inches apart from each other, so that the gap between the legs 170 at the bottom leg sections 176 can be about 2.9 inches wide. The legs can extend inwardly toward each other in other ways, such as where the entirety of each of the legs constantly slant inwardly toward the other leg as it extends down from the bridge. Or the legs may include portions that extend horizontally toward each other at the bottoms of the legs, as another example. Such inwardly extending legs can accommodate wider armrests where the gap between the legs is wider near the top of the legs while still allowing the legs to clamp in on the narrower portion of the chair below the armrests (such as clamping on the armrest support 116) to help secure the caddy to the chair.

In the illustrated examples, each leg 170 can be a plate, but in other examples each leg may take some other form, such as one or more smaller plates, one or more rods, etc. The legs 170 can each include holes such as a pair of inner holes 178 and a pair of outer holes 180, which can be used to receive fasteners for hanging medical equipment 122. Each pair of inner holes 178 can be positioned higher than the outer holes 180 on the same one of the legs 170, and the holes in each pair of inner holes 178 can be closer to each other than the holes in each pair of outer holes 180. The inner leg surfaces 182 of the legs 170 can be designed to be biased inwardly to grip the armrest 112 and/or the armrest support 116 securely, which can help secure the caddy 150 on the armrest 112, as illustrated in FIG. 1.

The caddy 150 can also feature a cord aperture 158 passing through the seat protrusions 156 such as channels at each end (front and back ends) of the remote seat 154. The seat protrusions 156 can be structured to allow the remote cord 144 to pass through the cord aperture while the call button remote 140 is seated in the remote seat 154, as illustrated in FIG. 1. The bottom bridge surface 160 of the caddy 150 can rest on the top armrest surface 114 when the caddy 150 is mounted on the armrest 112.

The caddy 150 can be placed on either armrest 112 of a chair 110. The caddy 150 can be removed from an armrest 112, be turned one-hundred and eighty degrees around a vertically-extending axis, and be replaced on the armrest and still be operational to support a call button remote 140 and medical equipment 122. Also, a call button remote 140 can be placed with its remote cord 144 extending to the front or to the back, and the remote cord 144 can still extend through a cord aperture 158 of the caddy 150, without moving the caddy 150. In the illustrated example, the caddy 150 can be symmetrical from side to side and from front to back. However, the caddy 150 may be asymmetrical in some ways in some examples.

The caddy 150 can be made from a transparent material so that the caddy 150 is transparent. Also, the caddy 150 can be made of a semi-rigid material, allowing it to maintain its shape without the application of external forces, but also allowing the caddy 150 to flex. For example, the legs 170 can be responsive to forces applied to them, flexing out from their resting positions to spread positions with elastic deformation. The legs 170 can be biased toward each other in the spread positions, which may squeeze the armrest 112 and/or the armrest support 116 to promote a secure fit of the caddy 150 on the armrest 112 (see FIG. 1).

The inner holes 178 and outer holes 180 in the legs 170 can be positioned to allow medical equipment 122, such as a Foley catheter bag 126, to hang or be suspended from the caddy 150 below the bladder of a person seated in the chair 110 and above the floor on which the chair 110 rests. For example, the Foley catheter bag hook 128 can extend into one of the lower outer holes 180, and the chest tube drainage system hooks 125 can extend into the inner holes 178. For example, the inner holes 178 can have a width between them that is approximately the same as a distance between holes of a set of chest tube drainage system hooks 125. For example, a distance between centers of the inner holes 178 can be about 6.5 inches, while a distance between centers of the outer holes 180 can be about 8.4 inches. Also, the outer holes 180 can be about 7.44 inches below the bottom bridge surface 160, or possibly between 7.44 inches below the bottom bridge surface 160 and 8.19 or 8.44 inches below the bottom bridge surface 160. In an example, the inner holes 178 can be about 5.72 inches below the bottom bridge surface 160. However, the holes in the legs 170 of the caddy 150 can be sized and positioned appropriately for suspending different medical equipment from the holes. In some examples, the caddy 150 may not include such holes. In other examples, the caddy 150 may include more holes, different numbers of holes, holes in different positions, and/or different sized holes.

The caddy 150 can be a single-use disposable product, so that the caddy 150 can be disposed of after a single use of the caddy 150, which can be a use with a single patient. The caddy 150 can be made from a recyclable material, which may promote environmental sustainability. As discussed above, with the caddy 150 mounted on the armrest 112, the legs 170 of the caddy 150 can squeeze the armrest 112 and/or the armrest support 116, providing a secure and stable mounting.

In summary, the caddy system 100 may provide a practical and efficient solution for organizing and managing medical equipment and accessories in a medical treatment room setting, helping to make items such as a call button remote and/or medical equipment easily accessible to patients and healthcare providers.

The caddy 150 can be made using one or more manufacturing techniques such as injection molding, thermoforming, additive manufacturing, and/or subtractive manufacturing. Manufacturing may include manufacturing the caddy 150 as a single continuous part. However, manufacturing the caddy 150 may include assembling multiple parts. For example, the caddy may be formed of two parts that are secured together using features of the two parts (e.g., features that allow the two parts to be snapped together) and/or separate fasteners.

In use, the caddy 150 can be mounted 210 on a chair by optionally spreading the legs apart with the bridge 152 positioned above the legs. While holding the legs 170 in such a spread position, a person can move the caddy 150 down over an armrest 112 of a chair 110 and/or slide the caddy 150 back along an armrest 112 of a chair 110 to mount the caddy 150 on the armrest 112 with the bottom bridge surface 160 resting on the top armrest surface 114 as illustrated in FIGS. 1-2. With the caddy 150 mounted on the armrest 112, hooks can be placed in the inner holes 178 and/or outer holes 180 to suspend 220 medical equipment 122 from the caddy 150 and therefore from the chair 110. The person such as a medical staff person can check that the medical equipment 122 supported by the caddy 150 is properly positioned (e.g., that a catheter bag is positioned lower than a patient's bladder). This checking may include checking that the lines 129 of the medical equipment are not trapped in the gap 184 between the legs 170 of the caddy 150. This checking can be facilitated by the caddy 150 being transparent (i.e., sufficiently transparent so that lines positioned between the legs 170 of the caddy 150 (and possibly trapped between the caddy 150 and the chair 110) can be seen). Also, a call button remote 140 (which is a medical call button remote, such as a hospital call button remote) can be positioned 230 in the remote seat 154 of the caddy 150 with the remote cord 144 extending through a cord aperture 158. Accordingly, the call button remote 140 can be positioned in a convenient position in the remote seat 154 to be stored, handled, and operated 240 by a patient 120 seated in the chair 110. For example, a patient 120 can press the call button 142. The call button remote 140 can respond to the button press by sending a signal through the remote cord 144 to a staff alert device in the calling system, thereby alerting staff that the call button 142 has been pressed by the patient 120, indicating that the patient desires the presence of the staff in the location of the chair 110.

Some aspects of the disclosure will now be discussed. In these aspects, features of implementations of the aspects may be combined together with the general aspects and with each other in any combination not precluded by specific language or by the nature of the features and aspects.

In one general aspect, a caddy system may include a caddy, including a shape where the caddy may include the following: a bridge defining a remote seat that is structured to receive a call button remote, the remote seat opening upwardly, and the caddy having one or more protrusions extending up from a periphery of the remote seat; and a pair of legs extending down from the bridge, with a downwardly opening gap formed between the legs.

Implementations may include one or more of the following features. The caddy can be structured to be removably mounted on a chair armrest. The caddy can be structured to position the remote seat above a chair armrest when the caddy is mounted on the armrest. The caddy can be structured to have its legs extend down on opposite sides of a chair armrest when the caddy is mounted on the armrest. The caddy can be transparent. The caddy can be semi-rigid so that the caddy maintains the shape without application of external forces to the caddy. The caddy can be responsive to forces applied to the legs with the legs flexing out from resting positions to spread positions with elastic deformation, the legs being biased toward each other in the spread positions. The legs can define holes for receiving fasteners for hanging medical equipment from the legs. The holes can extend through the legs in substantially medial-lateral directions when the caddy is mounted on a chair armrest. The caddy can be structured so that when the caddy is mounted on an armrest of a chair at least one of the holes is positioned so that a standard Foley catheter bag hanging from the at least one of the holes is located below a bladder of a person seated in the chair and above a floor on which the chair is resting. Each of the legs can define at least one hole for receiving fasteners for hanging medical equipment from the legs. At least a portion of each of the legs can extend inwardly toward the other leg when no external forces are applied to the caddy. At least one channel can extend from the remote seat and can be structured to receive a cord of a call button remote while the call button remote is seated in the remote seat. Channels on each end of the remote seat can be structured to receive a cord of a call button remote while the remote is seated in the remote seat. The caddy may include a recyclable material. The caddy system may include: an armrest of a medical chair upon which the caddy is mounted; and a call button remote that is seated in the remote seat of the caddy above the armrest. The legs of the caddy can squeeze one or more of an armrest of the medical chair and a support of the armrest of the medical chair. The legs of the caddy may include plates.

In another general aspect, a caddy system may include a caddy that is structured to be removably mounted on a medical chair armrest, the caddy having a remote seat structured to receive a call button remote, the caddy defining apertures on opposite ends of the remote seat, each of the apertures being structured to receive a cord of a call button remote while the call button remote is seated in the remote seat.

Implementations may include one or more of the following features. The caddy system may include: an armrest of a medical chair upon which the caddy is mounted; and a call button remote that is seated in the remote seat of the caddy above the armrest. The caddy may include a pair of legs descending from a bridge that includes the remote seat, the legs defining one or more holes receiving one or more hooks, with one or more items of medical equipment hanging from the one or more hooks. The one or more items of medical equipment may include a chest tube drainage system. The one or more items of medical equipment may include a Foley catheter bag.

In another general aspect, a method may include mounting a caddy on an armrest of a medical chair, the caddy having: a bridge defining an upwardly open remote seat; and a pair of legs extending down from the bridge on opposite sides of the armrest. The method may also include positioning at least a portion of a call button remote in a seated position on the remote seat with at least a portion of the call button remote being above the armrest of the medical chair.

Implementations may include one or more of the following features. In the seated position, the at least a portion of the call button remote can be directly above the armrest of the medical chair (i.e., at least a portion at a higher level than the armrest and not to the side of the armrest). Each leg of the legs of the caddy can define one or more holes extending through the leg in a direction toward the other leg, the one or more holes being structured to receive one or more fasteners that support medical equipment suspended from the one or more fasteners. The method may include suspending medical equipment from the caddy, the suspending of the medical equipment from the caddy including placing one or more fasteners in the one or more holes of one of the legs of the caddy. The method can include disposing of the caddy after a single use, such as using the caddy with a single patient in a medical facility.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show all the ways in which particular techniques can be used in conjunction with other techniques.

While particular embodiments are discussed above, it will be understood by those skilled in the art that various changes in form and details may be made therein without departing from the spirit and scope of the invention. For example, the caddy may include the call button remote seat but not include the holes for hanging other types of medical equipment from the caddy. Also, the caddy may include the holes for hanging medical equipment without including the call button remote seat.

I claim:

1. A caddy system comprising:

a caddy that is structured to be removably mounted on a medical chair armrest, the caddy comprising a remote seat structured to receive a call button remote, the caddy defining apertures on opposite ends of the remote seat, each of the apertures being structured to receive a cord of a call button remote while the call button remote is seated in the remote seat;

an armrest of a medical chair upon which the caddy is mounted; and a call button remote that is seated in the remote seat of the caddy above the armrest, wherein the caddy comprises a pair of legs descending from a bridge that includes the remote seat, the legs defining one or more holes receiving one or more hooks, with one or more items of medical equipment hanging from the one or more hooks.

2. The caddy system of claim 1, wherein the one or more items of medical equipment comprises a chest tube drainage system.

3. The caddy system of claim 1, wherein the one or more items of medical equipment comprises a Foley catheter bag.

* * * * *